US012607785B2

(12) United States Patent
Kusaka et al.

(10) Patent No.: US 12,607,785 B2
(45) Date of Patent: Apr. 21, 2026

(54) OPTICAL COMPUTATION SYSTEM

(71) Applicant: FUJIKURA LTD., Tokyo (JP)

(72) Inventors: Hiroyuki Kusaka, Tokyo (JP);
Masahiro Kashiwagi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 638 days.

(21) Appl. No.: 17/923,735

(22) PCT Filed: Aug. 18, 2021

(86) PCT No.: PCT/JP2021/030195
§ 371 (c)(1),
(2) Date: Nov. 7, 2022

(87) PCT Pub. No.: WO2022/130690
PCT Pub. Date: Jun. 23, 2022

(65) Prior Publication Data
US 2023/0176267 A1      Jun. 8, 2023

(30) Foreign Application Priority Data
Dec. 18, 2020      (JP) ................................. 2020-210653

(51) Int. Cl.
*G02B 5/18*            (2006.01)
*G02F 1/01*            (2006.01)
(52) U.S. Cl.
CPC ................. *G02B 5/18* (2013.01); *G02F 1/01* (2013.01); *G02B 2207/117* (2013.01)
(58) Field of Classification Search
USPC ........................................................ 359/558
See application file for complete search history.

(56) References Cited

U.S. PATENT DOCUMENTS 7,847,225 B2   12/2010  Yokoyama
2006/0050391 A1*  3/2006  Backlund ............. G02B 5/1847
                                                           359/569
(Continued)

FOREIGN PATENT DOCUMENTS

CN          106125364 A      11/2016
CN          109581697 A       4/2019
(Continued)

OTHER PUBLICATIONS

Jeffrey A. Davis et al., "Programmable optial interconnections with large fan-out capability using the magneto-optic spatial light modulator", Optics Letters, Jan. 1, 1989. vol. 14, No. 1, pp. 102-104 (3 pages).

(Continued)

*Primary Examiner* — Dung T Nguyen
(74) *Attorney, Agent, or Firm* — Osha Bergman Watanabe & Burton LLP

(57)          ABSTRACT

An optical computing system includes: an intensity modulation device group including at least two intensity modulation devices, each of which includes modulation cells, wherein each of the modulation cells of each of the intensity modulation devices carries out intensity modulation with respect to carrier light in accordance with one of signals to generate a signal light beam, and each of the signals corresponds to each of the intensity modulation devices; and a light diffraction element including diffraction cells having respective thicknesses or refractive indices set independently of each other, wherein each of the diffraction cells receives the signal light beam from each of the modulation cells of each of the intensity modulation devices corresponding to each of the diffraction cells, and by causing signal light beams to have respective different optical path lengths
(Continued)

to the light diffraction element, the signal light beams have respective different phases.

3 Claims, 4 Drawing Sheets

(56) References Cited

U.S. PATENT DOCUMENTS

| | | | |
|---|---|---|---|
| 2009/0195857 A1 | 8/2009 | Branson et al. | |
| 2019/0212544 A1* | 7/2019 | Heber | G02F 1/01 |
| 2020/0333668 A1 | 10/2020 | Hu et al. | |

FOREIGN PATENT DOCUMENTS

| | | | |
|---|---|---|---|
| CN | 110998418 A | 4/2020 | |
| CN | 111095128 A | 5/2020 | |
| JP | 2006106243 A | 4/2006 | |
| JP | 2007057622 A | 3/2007 | |
| JP | 4227667 B1 | 2/2009 | |
| JP | 2009-146542 A | 7/2009 | |
| JP | 2016-145938 A | 8/2016 | |
| JP | 2019-70784 A | 5/2019 | |
| JP | 2019-529998 A | 10/2019 | |
| WO | 2009/133592 A1 | 11/2009 | |

OTHER PUBLICATIONS

International Search Report issued in corresponding International Application No. PCT/JP2021/030195 mailed Nov. 9, 2021 (3 pages).
Written Opinion issued in corresponding International Application No. PCT/JP2021/030195 mailed Nov. 9, 2021 (3 pages).
English translation of International Preliminary Report on Patentability issued in corresponding Internaioanl Application No. PCT/JP2021/030195 dated Jun. 13, 2023 (4 pages).

* cited by examiner

10A 2     4     5     1     3

CARRIER
LIGHT
(IDENTICAL
PHASE)

CARRIER
LIGHT
(DIFFERENT
PHASE)

SIGNAL
LIGHT
(DIFFERENT
PHASE)

SIGNAL S1, S2, ···, Sn

2

B

OPTICAL COMPUTATION SYSTEM

BACKGROUND

Technical Field

The present invention relates to an optical computing system that uses a light diffraction element to carry out computing.

Description of the Related Art

A light diffraction element is known that includes a plurality of microcells each of which has an individually set refractive index. The light diffraction element optically carries out predetermined computing by causing light beams which have passed through the respective microcells to mutually interfere with each other. Optical computing carried out with use of a light diffraction element has an advantage of achieving higher speed and lower electric power consumption as compared with electrical computing carried out with use of a processor. Patent Literature 1 discloses an optical neural network having an input layer, an intermediate layer, and an output layer. The light diffraction element described earlier can be used as, for example, an intermediate layer of such an optical neural network.

PATENT LITERATURE

Patent Literature 1: U.S. Pat. No. 7,847,225

However, a conventional light diffraction element is merely capable of carrying out specific optical computing upon receiving light having a specific wavelength. Thus, an optical computing system has not been achieved that is capable of using a single light diffraction element to carry out computing optically and in parallel with respect to a plurality of different signals.

SUMMARY

An optical computing system according to one or more embodiments is capable of using a single light diffraction element to carry out computing optically and in parallel with respect to a plurality of different signals.

An optical computing system according to one or more embodiments employs a configuration to include a light diffraction element constituted by a plurality of cells that have respective thicknesses or refractive indices set independently of each other, a plurality of signal light beams being input to the respective plurality of cells of the light diffraction element, the plurality of signal light beams having been modulated by respective different signals and having respective different phases.

An optical computing system according to one or more embodiments makes it possible to achieve an optical computing system that is capable of using a single light diffraction element to carry out computing optically and in parallel with respect to a plurality of different signals.

DESCRIPTION OF THE EMBODIMENTS

[Configuration of Light Diffraction Element]

Figure 1:
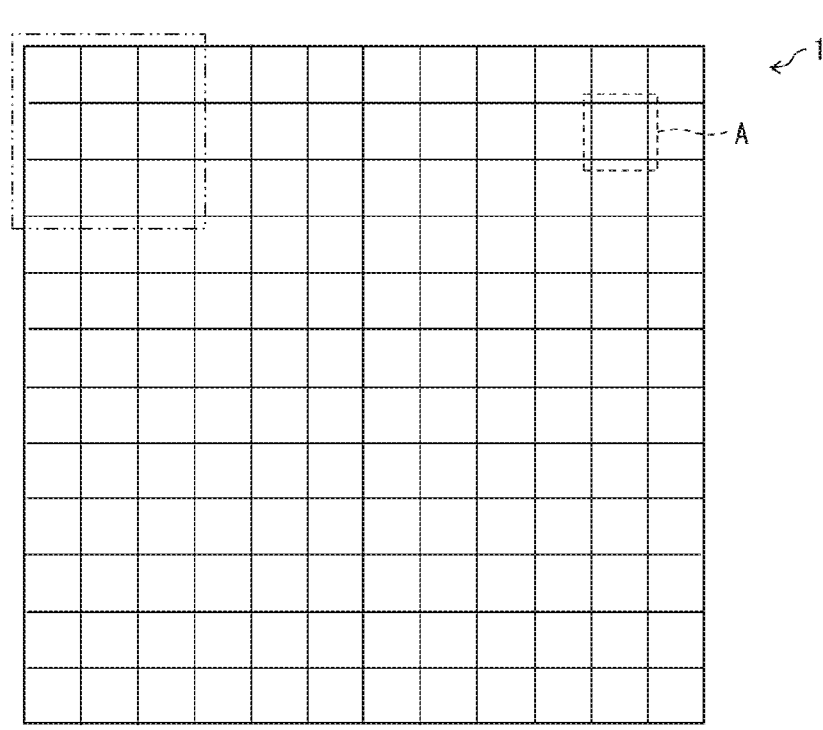
FIG. 1 is a plan view illustrating a configuration of a light diffraction element that is used to be shared between embodiments.
Figure 2:
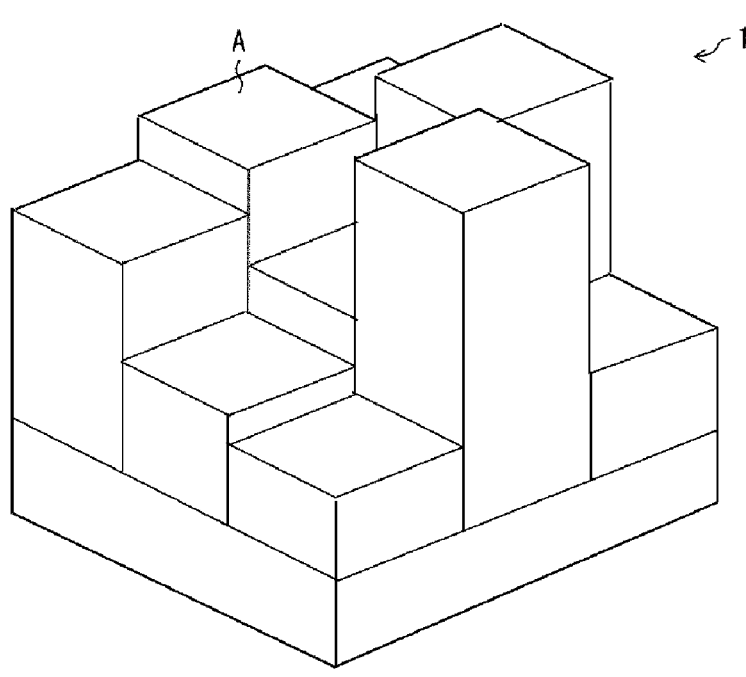
FIG. 2 is an enlarged perspective view of a part of the light diffraction element illustrated in FIG. 1.

The following description will discuss, with reference to FIGS. 1 and 2, a configuration of a light diffraction element 1 that is used to be shared between the embodiments. FIG. 1 is a plan view of the light diffraction element 1. FIG. 2 is an enlarged perspective view of a part (part surrounded by dashed lines in FIG. 1) of the light diffraction element 1.

The light diffraction element 1 is a planar light diffraction element and is constituted by a plurality of microcells A (an example of "cells" in Claims) that have respective thicknesses or refractive indices set independently of each other. In response to signal light having entered the light diffraction element 1, signal light beams that have passed through the respective microcells A mutually interfere with each other, so that predetermined optical computing is carried out. An intensity distribution of the light beams that are output from the light diffraction element 1 shows a result of the signal light beams.

Note here that the term "microcell" refers to, for example, a cell having a cell size of less than 10 μm. Note also that the term "cell size" refers to a square root of an area of a cell. For example, in a case where a microcell has a square shape in a plan view, the cell size is a length of one side of the cell. The cell size has a lower limit that is not particularly limited and can be, for example, 1 nm.

The light diffraction element 1 illustrated in FIG. 1 is constituted by 12×12 microcells A that are arranged in a matrix pattern. Each of the microcells A has, for example, a square shape having a size of 1 μm×1 μm in a plan view. The light diffraction element 1 has, for example, a square shape having a size of 12 μm×12 μm in a plan view.

A phase-change amount of light that passes through a microcell A can be set independently for each of the cells by (1) setting a thickness of the microcell A independently for each of the cells or (2) selecting a refractive index of the microcell A independently for each of the cells. One or more embodiments employ the method (1), which can be carried out by nanoimprinting. In this case, as illustrated in FIG. 2, each of the microcells A is constituted by a pillar that has a quadrangular prism shape and that has a square bottom surface that has sides each having a length equal to a cell size. In this case, a phase-change amount of light that passes through a microcell A is determined in accordance with a height of the pillar. That is, the light that passes through the microcell A which is constituted by a pillar having a high height has a large phase-change amount, and the light that passes through the microcell A which is constituted by a pillar having a low height has a small phase-change amount.

Note that the thickness or the refractive index of each of the microcells A can be set, for example, with use of machine learning. A model used in the machine learning can be, for example, a model in which an intensity distribution of input light to the light diffraction element 1 is an input and an intensity distribution of output light from the light diffraction element 1 is an output and which includes the thickness or the refractive index of each of the microcells A as a parameter. Note here that the intensity distribution of the input light refers to, for example, an intensity of input light that is input to the microcells A of the light diffraction element 1. Note also that the output light refers to light generated by mutual interference between light beams that have passed through the respective microcells A of the light diffraction element 1. The intensity distribution of the output light refers to, for example, an intensity of output light that is input to microcells of a light diffraction element (or cells of an image sensor) disposed so as to follow the light diffraction element 1.

Example 1

Figures 3, 4:
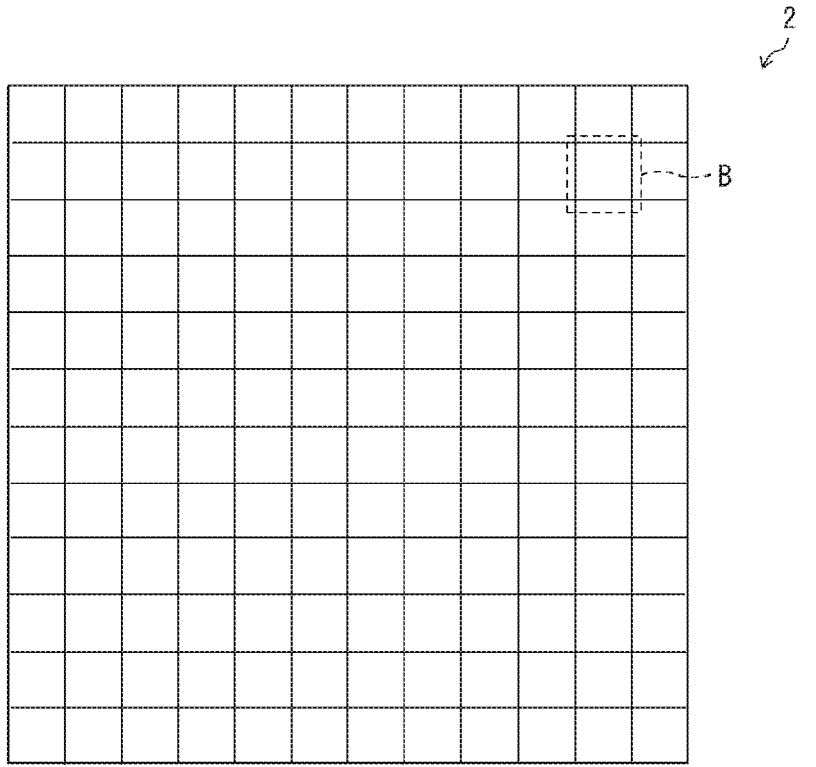
FIG. 3 is a plan view illustrating a configuration of a main part of an optical computing system according to one or more embodiments.
FIG. 4 is a plan view of a light-emitting device included in the optical computing system of FIG. 3.
Figure 5:
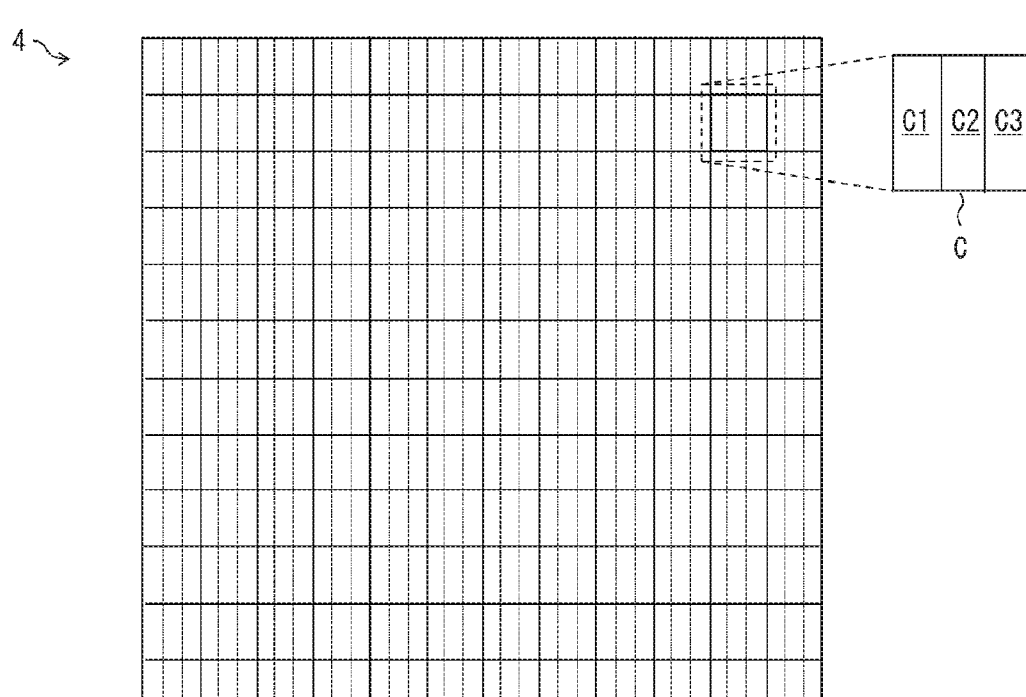
FIG. 5 is a plan view of a phase-shifting device included in the optical computing system of FIG. 3.
Figure 6:
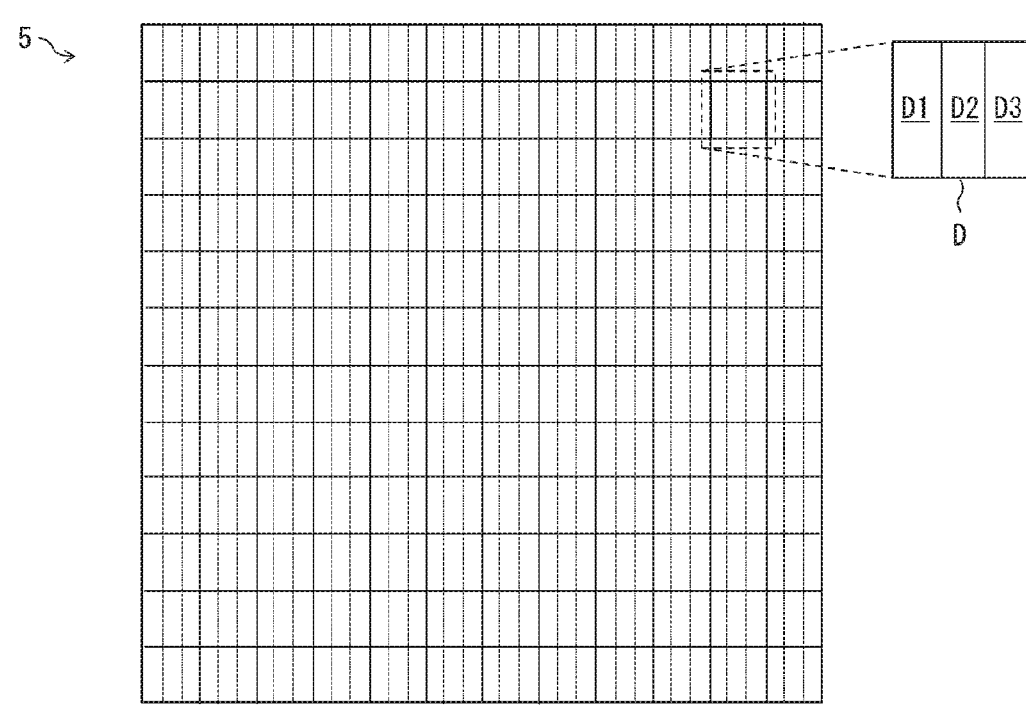
FIG. 6 is a plan view of an intensity modulation device included in the optical computing system of FIG. 3.

The following description will discuss, with reference to FIGS. 3 to 6, an optical computing system 10A according to one or more embodiments. FIG. 3 is a plan view illustrating a configuration of the optical computing system 10A. FIG. 4 is a plan view of a light-emitting device 2 included in the optical computing system 10A. FIG. 5 is a plan view of a phase-shifting device 4 included in the optical computing system 10A. FIG. 6 is a plan view of an intensity modulation device 5 included in the optical computing system 10A.

The optical computing system 10A includes not only the light diffraction element 1 described earlier but also the light-emitting device 2, a light-receiving device 3, the phase-shifting device 4, and the intensity modulation device 5.

The light-emitting device 2 is a device for generating carrier light. As illustrated in FIG. 4, the light-emitting device 2 has a plurality of cells B that are arranged in a matrix pattern, and is constituted by, for example, a two-dimensional display.

The phase-shifting device 4 is disposed on an optical path of carrier light that has been output from the light-emitting device 2. The phase-shifting device 4 is a device for phase-shifting the carrier light that has been output from the light-emitting device 2. As illustrated in FIG. 5, the phase-shifting device 4 has a plurality of cells C that are arranged in a matrix pattern. The cells C of the phase-shifting device 4 and the cells B of the light-emitting device 2 are in a one-to-one correspondence. The carrier light that has been output from each of the cells B of the light-emitting device 2 is input to a corresponding cell C of the phase-shifting device 4. Each of the cells C of the phase-shifting device 4 is divided into n (n is a natural number that is not less than 2) subcells C1, C2, . . . , Cn. Subcells Ci (i=1, 2, . . . , n) included in a cell C of the phase-shifting device 4 phase-shift the carrier light that has been output from a cell B of the light-emitting device 2, the cell B corresponding to the cell C. Phase shift amounts (amounts of change in phase) $\delta 1$, $\delta 2$, . . . , $\delta n$ of the subcells C1, C2, . . . , Cn satisfy $0 \leq \delta 1 < \delta 2 < . . . < \delta n < 2\pi$. In Example 1, the number of subcells n is 3. Furthermore, in Example 1, the subcell C1 has a phase shift amount $\delta 1$ [rad] of 0, the subcell C2 has a phase shift amount $\delta 2$ [rad] of 2/3n, and the subcell C3 has a phase shift amount $\delta 3$ [rad] of 4/3n.

The intensity modulation device 5 is disposed on an optical path of the carrier light that has been output from the phase-shifting device 4. The intensity modulation device 5 is a device for generating signal light by carrying out intensity modulation, in accordance with n signals S1, S2, . . . , Sn, with respect to the carrier light that has been output from the phase-shifting device 4. As illustrated in FIG. 6, the intensity modulation device 5 has a plurality of cells D that are arranged in a matrix pattern. The cells D of the intensity modulation device 5 and the cells C of the phase-shifting device 4 are in a one-to-one correspondence. The carrier light that has been output from each of the cells C of the phase-shifting device 4 is input to a corresponding cell D of the intensity modulation device 5. Each of the cells D of the intensity modulation device 5 is divided into n subcells D1, D2, . . . , Dn as in the case of each of the subcells Ci of the phase-shifting device 4. Each of subcells Di included in a cell D of the intensity modulation device 5 carries out intensity modulation, in accordance with a signal Si, with respect to the carrier light that has been output from a subcell Ci included in a cell C of the phase-shifting device 4, the cell C corresponding to the cell D.

The light diffraction element 1 is disposed on an optical path of the signal light that has been output from the intensity modulation device 5. As illustrated in FIG. 1, the light diffraction element 1 has a plurality of microcells A that are arranged in a matrix pattern. The microcells A of the light diffraction element 1 and the cells D of the intensity modulation device 5 are in a one-to-one correspondence. The signal light that has been output from each of the cells D of the intensity modulation device 5 is input to a corresponding microcell A of the light diffraction element 1. That is, the signal light that is input to the microcells A of the light diffraction element 1 includes signal light that has been subjected to intensity modulation carried out in accordance with the signal S1 and that has the phase shift amount $\delta 1$, signal light that has been subjected to intensity modulation carried out in accordance with the signal S2 and that has the phase shift amount $\delta 2$, . . . , and signal light that has been subjected to intensity modulation carried out in accordance with the signal Sn and that has a phase shift amount $\delta n$. As described earlier, the light diffraction element 1 carries out predetermined optical computing by causing signal light beams that have passed through the respective microcells A to mutually interfere with each other.

The light-receiving device 3 is disposed on an optical path of the signal light that has been output from the light diffraction element 1. The light-receiving device 3 is a device for detecting signal light that has been output from the light diffraction element 1. The light-receiving device 3 has a plurality of cells that are arranged in a matrix pattern, and is constituted by, for example, a two-dimensional image sensor. Signal light that has passed through a microcell A of the light diffraction element 1 interferes with light that has passed through another microcell A of the light diffraction element 1, and is input to each of the cells of the light-receiving device 3. Each of the cells of the light-receiving device 3 detects an intensity distribution of light obtained by superimposition of signal light having a phase shift amount of $\delta 1$, signal light having a phase shift amount of $\delta 2$, . . . , and signal light having a phase shift amount of $\delta n$. Note here that the intensity distribution of the light obtained by the superimposition represents a sum of a result of predetermined optical computing carried out with respect to signal light that has been subjected to intensity modulation carried out in accordance with the signal S1, a result of predetermined optical computing carried out with respect to signal light that has been subjected to intensity modulation carried out in accordance with the signal S2, . . . , and a result of predetermined optical computing carried out with respect to signal light that has been subjected to intensity modulation carried out in accordance with the signal Sn. Note that intensity distributions of the signal light having a phase shift amount of δ1, the signal light having a phase shift amount of δ2, . . . , and the signal light having a phase shift amount of δn may be individually detected by dividing each of the cells of the light-receiving device 3 into subcells and adding different filters to the respective subcells.

As described above, according to the optical computing system 10A, n signal light beams are input to a microcell A of the light diffraction element 1, the n signal light beams having been subjected to intensity modulation carried out in the intensity modulation device 5 by the respective n sub-cells D1, D2, . . . , Dn included in a cell D corresponding to the microcell A. According to the optical computing system 10A, by causing the subcells Ci to have respective different phase shift amounts in the phase-shifting device 4, n signal light beams that are input to the respective microcells A of the light diffraction element have respective different phases.

With this configuration, the optical computing system 10A makes it possible to use a single light diffraction element 1 to carry out computing optically and in parallel with respect to the signals S1, S2, . . . , Sn that are different from each other. For example, it is possible to use a single light diffraction element 1 to carry out computing optically and in parallel with respect to color components of an image signal indicative of a color image. In this case, a red (R) component of the image signal, a green (G) component of the image signal, and a blue (B) component of the image signal may be input, as the signal S1, the signal S2, and the signal S3, respectively, to the intensity modulation device 5.

Example 1 employs the configuration in which a single light diffraction element 1 is disposed on an optical path of signal light that has been output from the intensity modulation device 5, and light that has passed through the light diffraction element 1 is input to the light-receiving device 3. Note, however, that the present invention is not limited to this configuration. For example, it is also possible to employ a configuration in which a plurality of light diffraction elements 1 disposed on an optical path of signal light that has been output from the intensity modulation device 5, and light that has passed through the light diffraction elements 1 is input to the light-receiving device 3. With the configuration, it is possible to achieve the optical computing system 10A that can sequentially carry out a plurality of types of optical computing.

Example 2

Figures 7, 8:
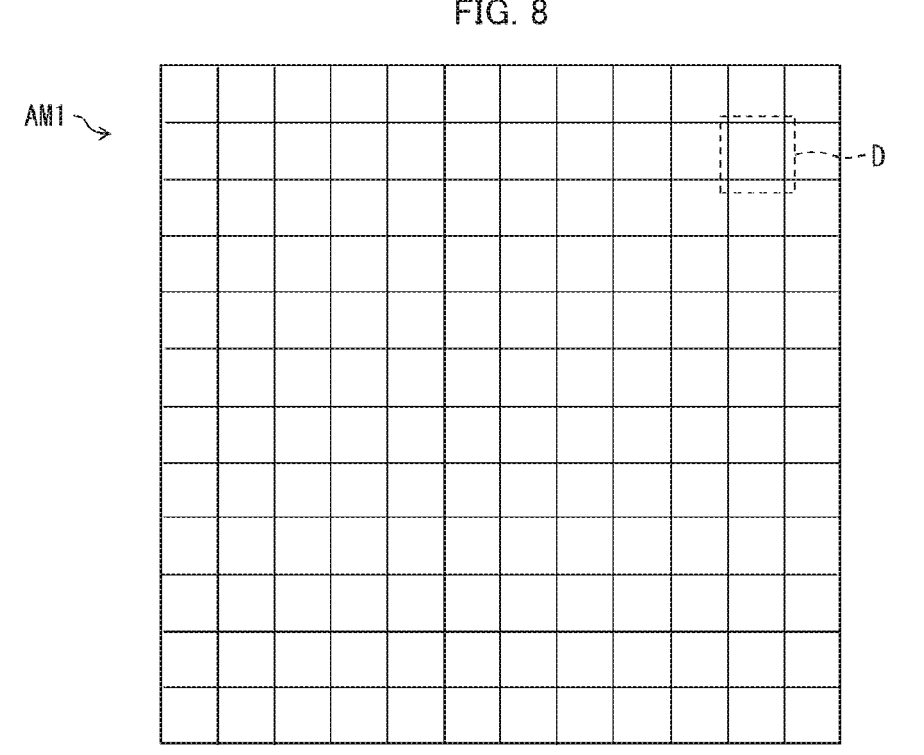
FIG. 7 is a plan view illustrating a configuration of a main part of an optical computing system according to one or more embodiments.
FIG. 8 is a plan view of an intensity modulation device included in the optical computing system of FIG. 7.

The following description will discuss, with reference to FIGS. 7 and 8, an optical computing system 10B according to one or more embodiments. FIG. 7 is a plan view illustrating a configuration of the optical computing system 10B. FIG. 8 is a plan view of an intensity modulation device AM1 included in the optical computing system 10B.

The optical computing system 10B includes not only a light diffraction element 1 described earlier but also a light-emitting device 2, a light-receiving device 3, an intensity modulation device group 5' consisting of n (n is a natural number that is not less than 2) intensity modulation devices AM1 to AMn, a mirror group Ma consisting of n mirrors Ma1 to Man, and a mirror group Mb consisting of n mirrors Mb1 to Mbn. Mirrors Ma1 to Man−1 and mirrors Mb1 to Mbn−1 are each a semi-transparent mirror that reflects 50% of light incident thereon and causes the remaining 50% of the light to pass there-through. In contrast, the mirrors Man and Mbn are each a mirror that reflects 100% of light incident thereon. The following description will discuss respective configurations of the devices assuming that n=3.

The light-emitting device 2 is a device for generating carrier light. As in the case of the optical computing system 10A in accordance with Example 1, the light-emitting device 2 has a plurality of cells B that are arranged in a matrix pattern, and is constituted by, for example, a two-dimensional display.

The mirror Ma1 is disposed on an optical path of carrier light that has been output from the light-emitting device 2. The mirror Ma1, which is a semi-transparent mirror, causes ½ of the carrier light that has been output from the light-emitting device 2 to pass therethrough and reflects the remaining ½ of the carrier light. The mirror Ma2 is disposed on an optical path of the carrier light that has been reflected by the mirror Ma1. The mirror Ma2, which is a semi-transparent mirror, causes ½ of the carrier light that has been reflected by the mirror Ma1 to pass therethrough and reflects the remaining ½ of the carrier light. The mirror Ma3 is disposed on an optical path of the carrier light that has passed through the mirror Ma2. The mirror Ma3 reflects the carrier light that has passed through the mirror Ma2.

The intensity modulation device AM1 is disposed on an optical path of the carrier light that has passed through the mirror Ma1. The intensity modulation device AM1 is configured to carry out intensity modulation, in accordance with a signal S1, with respect to the carrier light that has passed through the mirror Ma1. As illustrated in FIG. 8, the intensity modulation device AM1 has a plurality of cells D that are arranged in a matrix pattern. The cells D of the intensity modulation device AM1 and cells B of the light-emitting device 2 are in a one-to-one correspondence. The carrier light that has been output from each of the cells B of the light-emitting device 2 is input to a corresponding cell D of the intensity modulation device AM1. A cell D of the intensity modulation device AM1 carries out intensity modulation, in accordance with the signal S1, with respect to the carrier light that has been output from a cell B of the light-emitting device 2, the cell B corresponding to the cell D.

The mirror Mb1 is disposed on an optical path of signal light that has been output from the intensity modulation device AM1. ½ of the signal light that has been output from the intensity modulation device AM1 passes through the mirror Mb1 and then is input to the light diffraction element 1.

The intensity modulation device AM2 is disposed on an optical path of the carrier light that has been reflected by the mirror Ma2. The intensity modulation device AM2 is configured to carry out intensity modulation, in accordance with a signal S2, with respect to the carrier light that has been reflected by the mirror Ma2. As in the case of the intensity modulation device AM1, the intensity modulation device AM2 has a plurality of cells D that are arranged in a matrix pattern. The cells D of the intensity modulation device AM2 and the cells B of the light-emitting device 2 are in a one-to-one correspondence. The carrier light that has been output from each of the cells B of the light-emitting device 2 is input to a corresponding cell D of the intensity modulation device AM2. A cell D of the intensity modulation device AM2 carries out intensity modulation, in accordance with the signal S2, with respect to the carrier light that has been output from a cell B of the light-emitting device 2, the cell B corresponding to the cell D.

The mirror Mb2 is disposed on an optical path of signal light that has been output from the intensity modulation device AM2. (1) ½ of the signal light that has been output from the intensity modulation device AM2 is reflected by the mirror Mb2, and (2) ½ of the signal light that has been reflected by the mirror Mb2 is reflected by Mb1 and then input to the light diffraction element 1.

The intensity modulation device AM3 is disposed on an optical path of the carrier light that has been reflected by the mirror Ma3. The intensity modulation device AM3 is configured to carry out intensity modulation, in accordance with a signal S3, with respect to the carrier light that has been reflected by the mirror Ma3. As in the case of the intensity modulation device AM1, the intensity modulation device AM3 has a plurality of cells D that are arranged in a matrix pattern. The cells D of the intensity modulation device AM3 and the cells B of the light-emitting device 2 are in a one-to-one correspondence. The carrier light that has been output from each of the cells B of the light-emitting device 2 is input to a corresponding cell D of the intensity modulation device AM3. A cell D of the intensity modulation device AM3 carries out intensity modulation, in accordance with the signal S3, with respect to the carrier light that has been output from a cell B of the light-emitting device 2, the cell B corresponding to the cell D.

The mirror Mb3 is disposed on an optical path of signal light that has been output from the intensity modulation device AM3. (1) ½ of the signal light that has been output from the intensity modulation device AM3 is reflected by the mirror Mb3, (2) ½ of the signal light that has been reflected by the mirror Mb3 passes through the mirror Mb2, and (3) ½ of the signal light that has passed through the mirror Mb2 is reflected by Mb1 and then input to the light diffraction element 1.

Note here that an optical path length L1 from the light-emitting device 2 to the light diffraction element 1 of signal light that is subjected to intensity modulation by the intensity modulation device AM1, an optical path length L2 from the light-emitting device 2 to the light diffraction element 1 of signal light that is subjected to intensity modulation by the intensity modulation device AM2, and an optical path length L3 from the light-emitting device 2 to the light diffraction element 1 of signal light that is subjected to intensity modulation by the intensity modulation device AM3 are different from each other. For example, in a case where the configuration illustrated in FIG. 7 is employed, these optical path lengths L1, L2, and L3 satisfy the following inequality: $L1 < L2 < L3$. Thus, a phase shift amount $\delta 1$ of signal light that has been subjected to intensity modulation by the intensity modulation device AM1 and is input to the light diffraction element 1, a phase shift amount $\delta 2$ of signal light that has been subjected to intensity modulation by the intensity modulation device AM2 and is input to the light diffraction element 1, and a phase shift amount $\delta 3$ of signal light that has been subjected to intensity modulation by the intensity modulation device AM3 and is input to the light diffraction element 1 are different from each other. For example, in a case where the configuration illustrated in FIG. 7 is employed, these phase shift amounts $\delta 1$, $\delta 2$, and $\delta 3$ satisfy the following inequality: $\delta 1 < \delta 2 < \delta 3$.

As illustrated in FIG. 1, the light diffraction element 1 has a plurality of microcells A that are arranged in a matrix pattern. The microcells A of the light diffraction element 1 and the cells D of each of the intensity modulation devices AM1, AM2, and AM3 are in a one-to-one correspondence. Signal light that has been output from each of the cells D of the intensity modulation device AM1 is input to a corresponding microcell A of the light diffraction element 1, signal light that has been output from each of the cells D of the intensity modulation device AM2 is input to a corresponding microcell A of the light diffraction element 1, and signal light that has been output from each of the cells D of the intensity modulation device AM3 is input to a corresponding microcell A of the light diffraction element 1. Thus, the signal light that is input to the microcells A of the light diffraction element 1 includes signal light that has been subjected to intensity modulation carried out in accordance with the signal S1 and that has the phase shift amount $\delta 1$, signal light that has been subjected to intensity modulation carried out in accordance with the signal S2 and that has the phase shift amount $67$ 2, and signal light that has been subjected to intensity modulation carried out in accordance with the signal S3 and that has the phase shift amount $\delta 3$. As described earlier, the light diffraction element 1 carries out predetermined optical computing by causing signal light beams that have passed through the respective microcells A to mutually interfere with each other.

The light-receiving device 3 is disposed on an optical path of the signal light that has been output from the light diffraction element. The light-receiving device 3 is a device for detecting signal light that has been output from the light diffraction element 1. As in the case of the light-receiving device 3 of the optical computing system 10A in accordance with Example 1, the light-receiving device 3 has a plurality of cells that are arranged in a matrix pattern, and is constituted by, for example, a two-dimensional image sensor. Signal light that has passed through a microcell A of the light diffraction element 1 interferes with light that has passed through another microcell A of the light diffraction element 1, and is input to each of the cells of the light-receiving device 3. Each of the cells of the light-receiving device 3 individually detects an intensity distribution of signal light having a phase shift amount of $\delta 1$, an intensity distribution of signal light having a phase shift amount of $\delta 2$, . . . , and an intensity distribution of signal light having a phase shift amount of $\delta n$. Note here that the intensity distribution of the signal light having a phase shift amount of $\delta 1$ represents a result of predetermined optical computing carried out with respect to signal light that has been subjected to intensity modulation carried out in accordance with the signal S1, the intensity distribution of the signal light having a phase shift amount of $\delta 2$ represents a result of predetermined optical computing carried out with respect to signal light that has been subjected to intensity modulation carried out in accordance with the signal S2, . . . , and the intensity distribution of the signal light having a phase shift amount of $\delta n$ represents a result of predetermined optical computing carried out with respect to signal light that has been subjected to intensity modulation carried out in accordance with the signal Sn.

As described above, according to the optical computing system 10B, n signal light beams are input to a microcell A of the light diffraction element 1, the n signal light beams having been subjected to intensity modulation carried out in the respective n intensity modulation devices AM1, AM2, . . . , AMn by a cell D corresponding to the microcell A. According to the optical computing system 10B, by causing signal light beams that are subjected to intensity modulation carried out by the respective intensity modulation devices AMi to have respective different optical path lengths Li from the light-emitting device 2 to the light diffraction element 1, n signal light beams that are input to the respective microcells A of the light diffraction element have respective different phases.

With this configuration, the optical computing system 10B makes it possible to use a single light diffraction element 1 to carry out computing optically and in parallel with respect to the plurality of signals S1, S2, . . . , Sn that are different from each other. For example, it is possible to use a single light diffraction element 1 to carry out computing optically and in parallel with respect to color components of an image signal indicative of a color image. In this case, a red (R) component of the image signal may be input, as the signal S1, to the intensity modulation device AM1, a green (G) component of the image signal may be input, as the signal S2, to the intensity modulation device AM2, and a blue (B) component of the image signal may be input, as the signal S3, to the intensity modulation device AM3.

Example 2 employs the configuration in which a single light diffraction element 1 is disposed on an optical path of signal light that has been output from the intensity modulation devices AM1, AM2, and AM3, and light that has passed through the light diffraction element 1 is input to the light-receiving device 3. Note, however, that the present invention is not limited to this configuration. For example, it is also possible to employ a configuration in which a plurality of light diffraction elements 1 are provided on an optical path of signal light that has been output from the intensity modulation devices AM1, AM2, and AM3, and light that has passed through the light diffraction elements 1 is input to the light-receiving device 3. With the configuration, it is possible to achieve the optical computing system 10B that can sequentially carry out a plurality of types of optical computing.

One or more embodiments can also be expressed as follows:

An optical computing system according to one or more embodiments employs a configuration to include a light diffraction element constituted by a plurality of cells that have respective thicknesses or refractive indices set independently of each other, a plurality of signal light beams being input to the respective plurality of cells of the light diffraction element, the plurality of signal light beams having been modulated by respective different signals and having respective different phases.

With the above configuration, a single light diffraction element can be used to carry out computing optically and in parallel with respect to the respective different signals.

An optical computing system according to one or more embodiments employs, in addition to the configuration in accordance with the first aspect, a configuration to further include: a phase-shifting device which is constituted by a plurality of cells, in which each cell C is divided into n (n is a natural number that is not less than 2) subcells C1, C2, . . . , Cn, and in which subcells Ci (i=1, 2, . . . , n) phase-shift carrier light; and an intensity modulation device which is constituted by a plurality of cells, in which each cell D is divided into n subcells D1, D2, . . . , Dn, and in which each subcell Di carries out intensity modulation, in accordance with a signal Si, with respect to the carrier light that has been output from a subcell Ci included in the cell C corresponding to the cell D in the phase-shifting device, n signal light beams being input to respective cells (microcells A) of the light diffraction element, the n signal light beams having been subjected to intensity modulation carried out in the intensity modulation device by the respective n subcells D1, D2, . . . , Dn included in the cell D corresponding to each of the cells (microcells A), and by causing the subcells Ci to have respective different phase shift amounts in the phase-shifting device, the n signal light beams having respective different phases, the n signal light beams being input to the respective cells A of the light diffraction element.

With the above configuration, the n signal light beams that have been modulated by the respective signals S1, S2, . . . , Sn and that have respective different phases can be input to the respective cells of the light diffraction element. This makes it possible to use a single light diffraction element to carry out computing optically and in parallel with respect to the signals S1, S2, . . . , Sn.

An optical computing system according to one or more embodiments employs, in addition to the configuration in accordance with the first aspect, a configuration to further include an intensity modulation device group which consists of n (n is a natural number that is not less than 2) intensity modulation devices AM1, AM2, . . . , AMn, in which each of intensity modulation devices AMi (i=1, 2, . . . , n) is constituted by a plurality of cells, and in which each cell D of the each of the intensity modulation devices AMi carries out intensity modulation with respect to carrier light in accordance with a signal Si, n signal light beams being input to respective cells (microcells A) of the light diffraction element, the n signal light beams having been subjected to intensity modulation carried out in the respective intensity modulation devices AM1, AM2, . . . , AMn by the cell D corresponding to each of the cells (microcells A), and by causing the signal light beams that are subjected to intensity modulation by the respective intensity modulation devices AMi to have respective different optical path lengths to the light diffraction element, the n signal light beams having respective different phases, the n signal light beams being input to the respective cells (microcells A) of the light diffraction element.

With the above configuration, the n signal light beams that have been modulated by the respective signals S1, S2, . . . , Sn and that have respective different phases can be input to the respective cells of the light diffraction element. This makes it possible to use a single light diffraction element to carry out computing optically and in parallel with respect to the signals S1, S2, . . . , Sn.

An optical computing system according to one or more embodiments employs, in addition to the configuration in accordance with any one of the first to third aspects, a configuration in which the cells of the light diffraction element are constituted by pillars that have respective heights set independently of each other.

With the above configuration, a nanoimprinting technique or the like can be used to easily produce a light diffraction element.

The present invention is not limited to the embodiments described above, but may be altered in various ways by a skilled person within the scope of the claims. Any embodiment based on a proper combination of technical means disclosed in the embodiments is also encompassed in the technical scope of the present invention.

REFERENCE SIGNS LIST

1 Light diffraction element
2 Light-emitting device
3 Light-receiving device
4 Phase-shifting device
5 Intensity modulation device
5' Intensity modulation device group
AM1, AM2, AM3 Intensity modulation device
10A, 10B Optical computing system.

The invention claimed is:
1. An optical computing system comprising:
an intensity modulation device group including at least two intensity modulation devices, each of which includes modulation cells, wherein each of the modulation cells of each of the intensity modulation devices carries out intensity modulation with respect to carrier light in accordance with one of signals to generate a signal light beam, and each of the signals corresponds to each of the intensity modulation devices; and a light diffraction element including diffraction cells having respective thicknesses or refractive indices set independently of each other, wherein each of the diffraction cells receives the signal light beam from each of the modulation cells of each of the intensity modulation devices corresponding to each of the diffraction cells, and by causing signal light beams to have respective different optical path lengths to the light diffraction element, the signal light beams have respective different phases.

2. The optical computing system as set forth in claim 1, wherein the diffraction cells include pillars having respective heights set independently of each other.

3. The optical computing system as set forth in claim 1, wherein the modulation cells are arranged in a matrix pattern.

\* \* \* \* \*